United States Patent
Aziz et al.

(10) Patent No.: US 9,106,462 B1
(45) Date of Patent: Aug. 11, 2015

(54) REDUCED POWER SERDES RECEIVER USING SELECTIVE ADAPTATION OF EQUALIZER PARAMETERS IN RESPONSE TO SUPPLY VOLTAGE AND OPERATING TEMPERATURE VARIATIONS AND TECHNIQUE FOR MEASURING SAME

(71) Applicant: LSI Corporation, San Jose, CA (US)

(72) Inventors: Pervez M. Aziz, Dallas, TX (US); Amaresh V. Malipatil, San Jose, CA (US); Mohammad S. Mobin, Orefield, PA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 14/336,986

(22) Filed: Jul. 21, 2014

(51) Int. Cl.
  *H04L 25/04* (2006.01)
  *H04L 25/03* (2006.01)

(52) U.S. Cl.
  CPC .................. *H04L 25/03057* (2013.01)

(58) Field of Classification Search
  CPC ............... H04L 25/03006; H04L 25/03057; H04L 25/03019; H04L 2025/03592
  USPC ........................................................ 375/233
  See application file for complete search history.

(56) References Cited

U.S. PATENT DOCUMENTS

| | | | |
|---|---|---|---|
| 8,121,183 B2 | 2/2012 | Zhong et al. | |
| 8,325,756 B2 | 12/2012 | Berman et al. | |
| 8,452,996 B2 | 5/2013 | Lee et al. | |
| 8,578,222 B2 | 11/2013 | Chun et al. | |
| 8,743,945 B2 | 6/2014 | Aziz | |
| 2007/0230554 A1* | 10/2007 | Said et al. | 375/232 |
| 2011/0142120 A1 | 6/2011 | Liu et al. | |
| 2012/0076181 A1 | 3/2012 | Aziz et al. | |
| 2013/0007489 A1 | 1/2013 | Unnikrishnan et al. | |
| 2013/0148712 A1* | 6/2013 | Malipatil et al. | 375/233 |

OTHER PUBLICATIONS

Sally Safwat et al.; A 12Gbps All Digital Low Power SerDes Transceiver for On-Chip Networking; Nano-electronics Integrated Systems Center (NISC); Northwestern University/Nile University; 978-1-4244-9474-3/11 © 2011 IEEE.

Bulzacchelli et al, "A 10-Gb/s 5-Tap DFE/4-Tap FFE Transceiver in 90-nm CMOS Technology", IEEE Journal of Solid-State Circuits, vol. 41, No. 12, pp. 2885-2900, Dec. 2006 (USA).

(Continued)

*Primary Examiner* — Kevin Kim

(74) *Attorney, Agent, or Firm* — Sheridan Ross P.C.

(57) ABSTRACT

Described embodiments include a process and apparatus that takes into account the operating voltage and temperature (VT) variations of a SERDES receiver implemented in an integrated circuit (IC) or system-on-chip (SoC). An analog equalizer (AEQ) adaptation loop and a decision feedback equalizer (DFE) adaptation loop are disabled after the loops have converged or stabilized the parameters of the AEQ and DFE. While the AFE and DFE adaptation loops are disabled, certain monitor coefficients related to signals corrected by the AFE and DFE are adapted and metrics derived therefrom are generated. The metrics are compared to threshold values to check if they have sufficiently changed over time to warrant re-enabling of the AFE and DFE adaptation loops.

25 Claims, 3 Drawing Sheets

(56) References Cited

OTHER PUBLICATIONS

Zhong et al., "A 1.0625 ~ 14.025 Gb/s Multi-Media Transceiver with Full-Rate Source-Series-Terminated Transmit Driver and Floating-Tap Decision-Feedback Equalizer in 40nm CMOS", IEEE Journal of Solid-State Circuits, vol. 46, No. 12, pp. 3126-3139, Dec. 2011 (USA).

Aziz et al., "A Class of Downsampled Floating Tap DFE Architectures with Application to Serial Links", presented at IEEE International Symposium on Circuits and Systems (ISCAS) May 20-23, 2012, (Seoul, Republic of Korea).

\* cited by examiner

REDUCED POWER SERDES RECEIVER USING SELECTIVE ADAPTATION OF EQUALIZER PARAMETERS IN RESPONSE TO SUPPLY VOLTAGE AND OPERATING TEMPERATURE VARIATIONS AND TECHNIQUE FOR MEASURING SAME

FIELD OF THE INVENTION

The present invention relates to receivers generally and, more specifically, to receivers having analog equalizers therein.

BACKGROUND

In many data communication applications, serializer and de-serializer (SERDES) devices facilitate the transmission of parallel data between two points across a serial link. Data at one point is converted from parallel data to serial data and transmitted through a communications channel to the second point where it received and converted from serial data to parallel data.

At high data rates frequency-dependent signal loss from the communications channel (the signal path between the two end points of a serial link), as well as signal dispersion and distortion, can occur. Ideally, without noise, jitter, and other loss and dispersion effects, a data eye at the receiver will exhibit a relatively ideal shape. In practice, the shape of the data eye changes with noise, jitter, other loss and dispersion effects, and with temperature and voltage variations. As such, the communications channel, whether wired, optical, or wireless, acts as a filter and might be modeled in the frequency domain with a transfer function. Correction for frequency dependent losses of the communications channel, and other forms of signal degradation, often requires signal equalization of the signal at a receiver.

Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer in the receiver with adaptive setting of parameters providing sufficient adjustable range might be employed to mitigate the signal degradation of the signal transmitted through the communications channel. The receive equalization might be through an analog equalizer (AEQ), a decision-feedback equalizer (DFE), or some combination of both. The shape of the data eye also changes due to equalization applied to input signal of the receiver. In some systems, equalization applied by a transmitter's equalizer further alters the shape of the eye from the ideal. The transfer characteristics of the AEQ and DFE are adaptive to enhance the performance of the SERDES receiver.

The DFE equalization optimizes for intersymbol interference (ISI) and opens up the vertical and horizontal data eye opening. In SERDES communication channels, DFE filtering is employed to cancel post-cursor ISI in the equalized channel's pulse response by subtracting the output of the DFE from an input signal. An adaptation processor implements a process or loop that attempts to minimize an error signal and thereby open further the vertical and horizontal data eye openings by continuously adjusting DFE parameters, here the DFE tap values.

To improve the performance of DFE-based receiver, the AEQ has a variable gain amplifier (VGA) used to control the input signal level, and a continuous-time analog equalizer (CTLE) used to compensate for linear, frequency-based distortions in the input signal to the receiver. The CTLE is generally implemented as an analog-based filter with at least one adjustable coefficient or peaking parameter that can at least partially compensate for linear distortions in the received signal. The above-mentioned adaptation processor also implements a process or loop that attempts to minimize an error signal and thereby open further the vertical and horizontal data eye openings by continuously adjusting various parameters of the AEQ, here the amount of gain provided by the VGA and the value of the CTLE coefficient.

The AEQ and DFE adaptation process might consume significant power even though the gain and coefficient parameters are changing little or not at all. However, to fully suspend the AEQ and DFE adaptation process runs the risk of degrading the performance of the SERDES receiver due to changes in the operating temperature and supply voltages the receiver is subject to that would normally require an update to the AEQ and DFE parameters. Thus, it is desirable to provide a technique for detecting receiver performance degradation due to temperature and operating voltage variations so that that the AEQ and DFE adaptation process may be suspended until needed, thereby reducing the power consumption of the SERDES receiver.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments [TBD]

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION

In accordance with exemplary embodiments, a process and apparatus is described herein that takes into account the operating voltage and temperature (VT) variations of a SERDES receiver implemented in an integrated circuit (IC) or system-on-chip (SoC) to selectively enable an analog equalizer or DFE adaptation loop after the loop has converged or stabilized the gain and coefficient parameters of the AEQ and tap values of the DFE. While the AEQ and DFE adaptation loops are suspended, certain coefficients are adapted and monitored to check if metrics derived from the coefficients have sufficiently changed over time to warrant re-enabling of the AEQ and DFE adaptation loops.

Table 1 summarizes a list of acronyms employed throughout this specification as an aid to understanding the described embodiments of the invention:

TABLE 1

| SERDES | Serializer/Deserializer | IC | Integrated Circuit |
|---|---|---|---|
| FIR | Finite Impulse Response | AEQ | Analog Equalizer |
| LMS | Least-Mean-Square | DFE | Decision Feedback |
| ADC | Analog to Digital Converter | | Equalizer |
| VGA | Variable Gain Amplifier | ISI | Intersymbol Interference |
| HF | High Frequency | AEQ | Analog Equalizer |
| LF | Low Frequency | PAM | Pulse Amplitude |
| CTLE | Continuous Time Linear | | Modulation |
| | Equalizer | VT | Voltage, Temperature |

Figure 1:
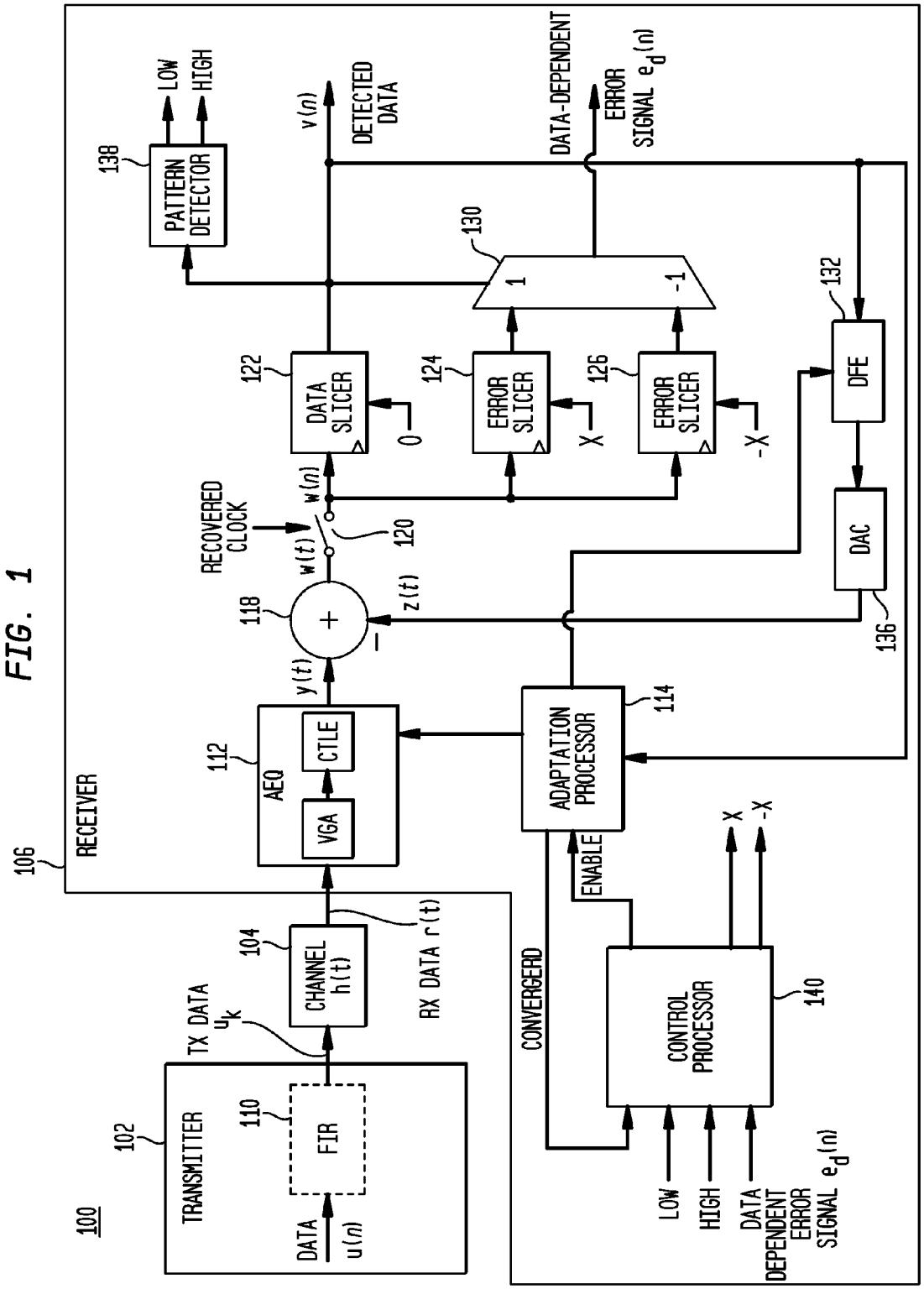
FIG. 1 shows a high level block diagram of a SERDES communication system employing transmit (TX) equalization, receive (RX) analog equalization and decision feedback equalization to detect data bits v(n)

FIG. 1 shows a block diagram of exemplary serializer-deserializer (SERDES) communication system 100. As shown in FIG. 1, SERDES system 100 includes transmitter 102, communication channel 104 and receiver 106. As shown, transmitter 102 might optionally include finite impulse response (FIR) filter 110 for conditioning data before transmission to communication channel 104. In some embodiments, the function of FIR 110 might optionally be moved from transmitter 102 to receiver 106. Transmitter 102 provides data u(n) as a transmit signal as serial data bits, $u_k$, via communication channel 104, to receiver 106. Communication channel 104 might typically be a physical transmission medium, such as a backplane, drive head in a magnetic recording system, copper cables, or optical fibers. Although described herein as being employed in a SERDES communication system, described embodiments are not so limited, and some embodiments might be employed in alternative communications systems employing a transmitter and a receiver communicating over a communication channel. The communication channel might be at least one of fiber optics, one or more coaxial cables, one or more twisted pair copper wires, and/or one or more radio frequency channels. Additionally, various signal modulation and de-modulation techniques might be employed. Further, although described herein as each "bit" of a signal having a corresponding logic value, it is understood that the various signals described herein might employ multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal-encoding scheme might be employed.

After passing though communication channel 104, the analog transmit signal might be filtered or equalized by analog equalizer (AEQ) 112 of receiver 106. The AEQ 112 is well known in the art and might comprise a variable gain amplifier (VGA) to amplify the received signal and a continuous time linear equalizer (CTLE). The analog signal output of AEQ 112, y(t), is given by relationship (1):

$$y(t) = r(t) \star h_A(t) \qquad (1)$$

where ★ denotes the continuous time convolution operation, r(t) is the signal received by receiver 106, and $h_A(t)$ is impulse response of AEQ 112.

The AEQ 112 is controlled by adaptation processor 114. In one example, the processor 114 adjusts the gain of the VGA and one or more coefficients of the CTLE in the AEQ 112 in response to the detected data v(n). A change in the coefficient of the CTLE will change the frequency-dependent characteristics of the received signals, such as the amount of high frequency peaking in the signal from AEQ in response to a coefficient value control signal received from the processor 114. Thus, by asserting the appropriate parameter values by the processor 114, the AEQ 112 will at least partially compensate for dispersion and other frequency-dependent distortions in the received signal r(t) due to the transmission path in the channel 104. As will be described below, the processor 114 iteratively adjusts (adapts) the gain and coefficient parameters to minimize the error signal by using, for example, a least-mean-square (LMS) algorithm.

A post-DFE equalized signal input to data slicer 122 is shown as w(t) prior to sampling, and w(n) after sampling, with the sampling operation represented in simplified form by switch 120. A conventional decision feedback equalization (DFE) 132 generates a DFE correction signal based on the data detected by data slicer 122. The output of AEQ 112 might be provided to an optional feed forward equalizer (FFE) (not shown) employed to reduce precursor ISI. DFE 132 generates equalized output based on one or more previous data decisions of data slicer 122 and pulse response coefficients (taps) corresponding to communication channel 104.

The DFE correction signal is converted to a continuous time analog signal by digital-to-analog (DAC) converter 136. The analog correction signal, z(t), is subtracted at analog summer 118 from the output signal, y(t), of AEQ 112 to produce DFE-corrected signal w(t), where w(t) is given by relationship (2):

$$w(t) = y(t) - z(t) \qquad (2)$$

DFE-corrected signal w(t) is sampled by switch 120 to produce sampled signal w(n), where w(n) is given by relationship (3):

$$w(n) = w(nT) \qquad (3)$$

where T is the baud period and n is the sample number. Many possible implementations for the sampling operation are known, for example by clocking data slicer 122 with a recovered clock generated from the received data by a clock recovery circuit (not shown) which might often be implemented as an adaptive feedback circuit to adjust the phase and frequency for sampling the analog waveform to allow proper data detection. Sampled signal w(n) is sliced by the data slicer 122 to produce the detected data v(n). Detected data v(n) sampled by data slicer 122 might typically be provided to subsequent modules (not shown) of receiver 106 for further processing.

Data slicer 122 compares input samples (e.g., in the digital domain) to a threshold, such as a zero-value threshold as shown, using the recovered clock. Data slicer 122 might typically be implemented as a decision device based on an amplitude threshold, but might also be a more complicated detector such as an analog-to-digital converter (ADC, not shown) and a sequence detector (not shown). Data slicer 122 produces a binary version of w(n) or a quantized version of w(n). If an ADC is employed, a multi-bit value is produced. For high-speed applications, the data slicer 122 might be clocked by the recovered clock. Data slicer 122 quantizes the input signal to a binary "1" or "0" based on the sampled analog value and a slicer threshold, $s_t$. If the input to data slicer 122 at time n is w(n), then the output, v(n), of data slicer 122 is given by relationship (4):

$$v(n) = 1 \text{ if } w(n) \geq s_t,$$

otherwise, $$v(n) = -1 \text{ if } w(n) \leq s_t \qquad (4)$$

The detected data v(n) is provided to the conventional DFE 132 to produce the filtered DFE output z(n), which is given by relationship (5):

$$z(n) = \sum_{l=1}^{L} b(l)v(n-l) \qquad (5)$$

where b(l) represents the tap coefficients of the DFE 132. The tap coefficients are generated by the adaptation processor 114 that uses, for example, an LMS algorithm to adjust the tap coefficients b(l) to minimize errors. It is understood that the DFE 132 might have its own adaptation processor separate from the processor 114 but controlled by control processor 140 discussed below.

A set of additional data slicers, shown as error slicer 124 and error slicer 126, having slicer thresholds X and −X generate a signed sampled error signal. Because the error signal is dependent on the data value being received, the multiplexer 130 selects the appropriate slicer 124, 126 to provide a data-dependent error signal, $e_d(n)$. As will be described in more detail below, control over adaptation by the processor 114 is determined in part by the data-dependent error signal e(n).

Responsive to the detected data v(n) is a pattern detector 138. As will be described in more detail below, the pattern detector 138 determines whether the receiver 106 is receiving a low frequency or a high frequency data pattern.

The adaptation processor 114 is enabled or disabled by a control processor 140 by the assertion or de-assertion of the control signal "ENABLE", respectively. As will be discussed in detail in relation to FIG. 2, the control processor 140 enables the adaptation processor 114 to adapt the gain and coefficient parameters of the AEQ 112 and tap values of the DFE 132. After the parameters have converged, the control processor disables the AEQ processor 114 and then begins to monitor the data-dependent error signal $e_d(n)$. If the control processor 140 determines that certain data frequency dependent metrics derived from the error signal $e_d(n)$ exceed a respective threshold, then the control processor 140 re-enables the adaptation processor 114 to again adapt the parameters of the AEQ 112 or the tap values of the DFE 132 to the received signal r(t).

For convenience, the adaptation processor 114 and the control processor 140 are shown separately but might be combined into a single controller or processor that might implement other functions of the receiver 106, such as the DFE 132, pattern detector 138, etc.

Figure 2:
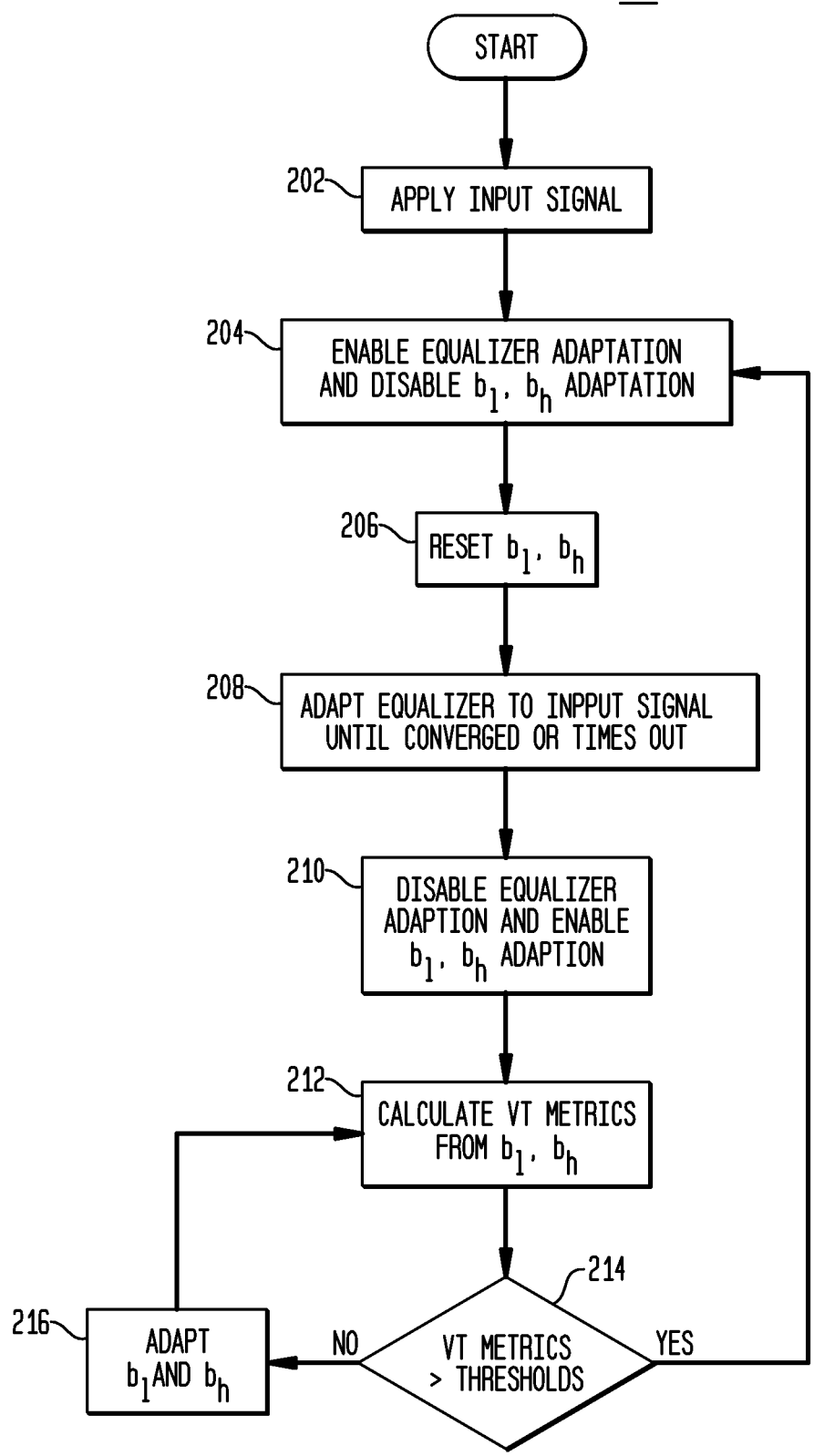
FIG. 2 shows an exemplary flowchart of an adaptation process used by the SERDES system receiver of FIG. 1.

In accordance with one embodiment of the invention, operation of a portion of the receiver 106 is shown in the flowchart of FIG. 2. Process 200 begins with step 202 where an input signal, r(t), is applied to the receiver 106 and the DFE 132 begins adapting to the input signal. Next, in step 204, the control processor 140 enables the adaptation processor 114 (signal "ENABLE" is asserted) to begin adapting the AEQ gain and coefficient parameters and the DFE tap coefficients. Then, in step 206 monitor coefficients $b_l$ and $b_h$ are reset to known values as will be discussed in more detail below.

Once the processor 114 is enabled and during adaptation, the processor 114, responsive to the detected data v(n), adjusts one or more gain and coefficient parameters of the VGA and CTLE in the AEQ 112 and DFE tap values either to reduce intersymbol interference during eye openings or to reduce signal transition jitter. An exemplary technique for adapting the VGA and CTLE is described in "Adaptation Algorithms for a Class of Continuous Time Analog Equalizers With Application to Serial Links", by P. M. Aziz and A V. Malipatil, Proceedings of the 2011 IEEE International Symposium on Circuits and Systems (ISCAS 2011), pp. 1383-1386, included by reference herein in its entirely. If the adaptation is an initial one (e.g., when the receiver 106 is first turned on) and in one embodiment, the VGA and CTLE gain and coefficient parameters might be initially set to user-specified values or by using predetermined values. However, for subsequent adaptations, the previously determined values might be used as the starting point by the processor 114.

Once the processor 114 has completed adapting because either the gain and coefficient parameters applied to AEQ 112 have converged (e.g., stopped changing, stabilized about a certain value) or a set time has elapsed (timeout), then processor 114 signals the control processor 140 that it has converged (signal "CONVERGED" is asserted) and in step 210 the AEQ processor 114 is disabled by control processor 140 de-asserting signal "ENABLE" and adaptation of monitoring coefficients $b_l$ and $b_h$ begins.

Monitor coefficients $b_l$ and $b_h$ are used by the control processor 140 to determine if the electrical characteristics of the DFE-corrected signal w(t) have changed more than a desirable amount while the adaptation of the AEQ 112 and DFE 132 are disabled. For example, the applied power supply voltages or temperature of the chip embodying the receiver 106 might change enough to cause the transfer characteristics of the AEQ 112 to cause the performance of the receiver to deteriorate and cause errors. In one embodiment of the invention, the monitor coefficients $b_l$ and $b_h$ track the low frequency and high frequency characteristics of the DFE-corrected signal. As described below, the coefficients $b_l$ and $b_h$ are used to calculate various metrics associated with the electrical characteristics of the DFE-corrected signal. Because those characteristics change slowly relative to the symbol period of the incoming data, the processor 140 can adapt the coefficients $b_l$ and $b_h$ at intervals much longer than the symbol period of the incoming data and, thus save power since the amount of power used by a processor is generally proportional to the rate it is processing data. Since the processor 114 consumes little or no power when it is disabled, the receiver 106 might achieve a significant power savings during normal operation when compared to prior art receivers that continuously adapt the AEQ gain and coefficients and DFE tap values.

In this embodiment of the invention and because one set of error slicers 124, 126 is provided that requires different threshold values depending on whether $b_l$ or $b_h$ is being adapted, either $b_l$ or $b_h$ is adapted depending on the whether low frequency or high frequency data adaptation is chosen, respectively. As a result, either $b_l$ or $b_h$ is adapted for some period of time, and then the other is adapted. For example, $b_l$ is adapted first and, once a time period has elapsed, then $b_h$ is adapted. The time period is typically much longer than the received data symbol period T, and might be as long as the interval Tmeas discussed below, e.g., tens or hundreds of thousands of times longer than the time interval T.

Depending on which coefficient is being adapted, the coefficients $b_l$ and $b_h$ at time n are adapted in accordance with the following relationships (6):

when low frequency data is being received: $b_l(n)=b_l(n-1)+\mu_l[v(n)e_d(n)]$; and when high frequency data is being received: $b_h(n)=b_h(n-1)+\mu_h[v(n)e_d(n)]$; (6)

where v(n) is the detected data from data slicer 122, $e_d(n)$ is the data-dependent error signal from multiplexer 130, and $\mu_l$ and $\mu_h$ are the low frequency (LF) and the high frequency (HF) loop gain values, respectively. Typical loop gain values are programmable and might be as high as $2^0$ or low as $2^{-20}$. Whether low or high frequency data is being received is determined by the pattern detector 138. Operation might be further understood from the following examples: if $b_l(n)$ is being adapted and low frequency data is not being received, then $b_l(n)$ is not updated. Similarly, if $b_h(n)$ is being adapted and high frequency data is not being received, then $b_h(n)$ is not updated.

The frequency content of the data v(n) is determined by the pattern detector 138. In one embodiment of the invention, when the pattern detector 138 detects consecutive same-value data bit pattern of exemplary length 6T or longer (T being the symbol period of the received data), e.g. 1, 1, 1, 1, 1, 1 or –1, –1, –1, –1, –1, –1, the signal LOW is asserted. Similarly, when the pattern detector detects a consecutive alternating polarity data bit pattern of 1T or less of run length 2, e.g., 1, –1, 1 or –1, 1, –1, then the signal HIGH is asserted. Alternatively, the signal HIGH is asserted when a 2T pattern of run length 6 is detected, e.g., –1, –1, 1, 1, –1, –1 or 1, 1, –1, –1,1,1. Depending on which signal is asserted, the control processor 140 selectively adapts the corresponding monitor coefficient in accordance with the relations given in (6). Thus, in this embodiment, the LOW or HIGH assertion will affect whether or not $b_l(n)$ or $b_h(n)$ is updated in (6). In another embodiment described below in connection with FIG. 3, both $b_l(n)$ and $b_h(n)$ are selected for updating simultaneously.

In one embodiment of the invention, the control processor 140 sets the slicer thresholds X, –X of the error slicers 124, 126 to be either $b_l$ or $b_h$. In this embodiment, the control processor 140 sets X equal to $b_l$ and –X equal to –$b_l$ if low frequency adaptation is chosen. Similarly, the control processor 140 sets X equal to $b_h$ and –X equal –$b_h$ if high frequency adaptation is chosen.

Figure 3:
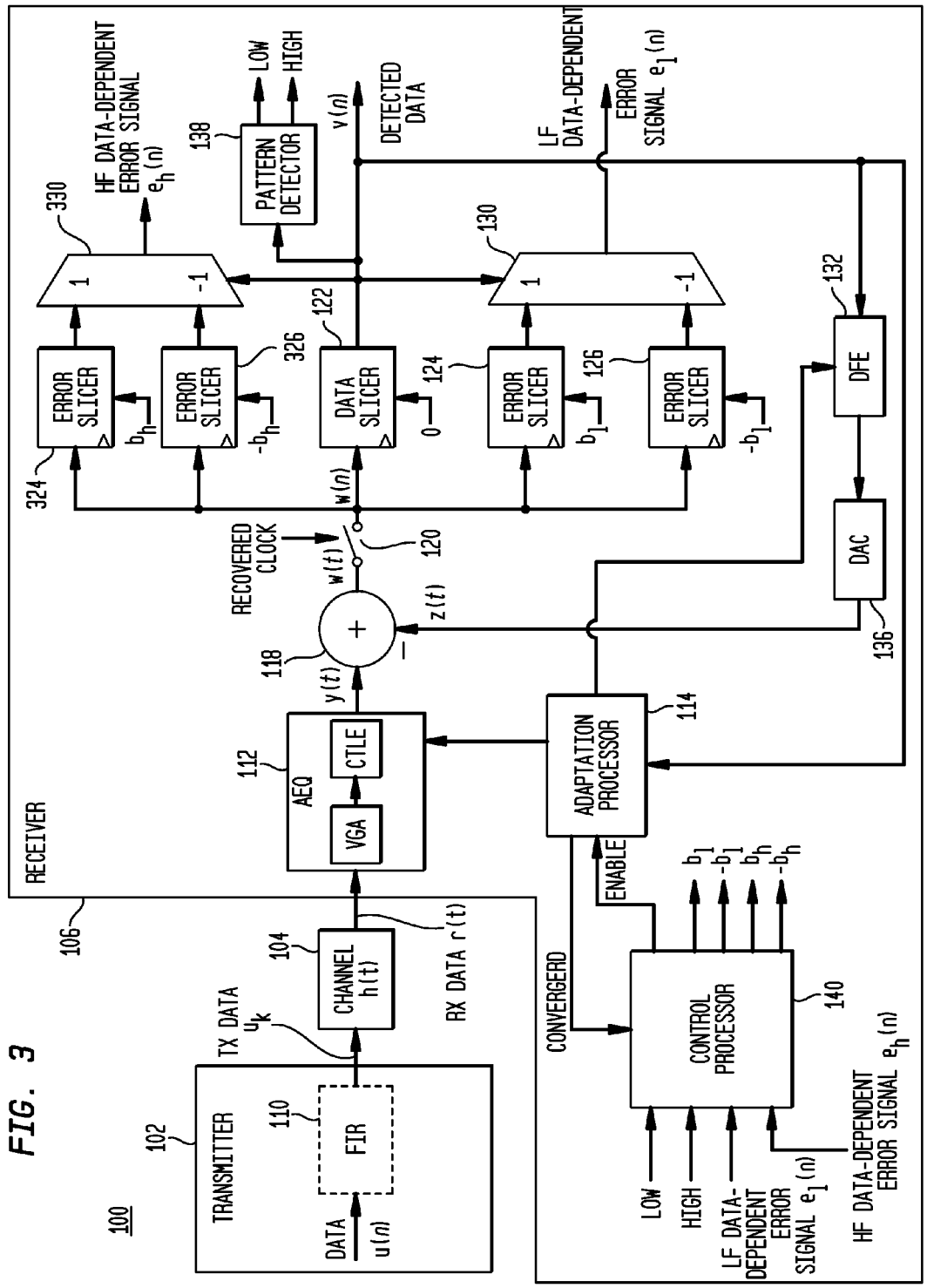
FIG. 3 shows an alternative embodiment of the SERDES system of FIG. 1.

In another embodiment of the receiver 106, two sets of error latches are provided, each receiving the coefficients $b_l$ and $b_h$ as illustrated in FIG. 3. In this embodiment, the error slicers 124, 126 receive slicer thresholds $b_l$, –$b_l$, respectively, from the control processor 140 and the multiplexer 130 provides a low frequency (LF) data dependent error signal to the control processor 140. Similarly, error slicers 324, 326 are provided that receive slicer thresholds $b_h$, –$b_h$, respectively, from the control processor 140 and a multiplexer 330 is provided that supplies a high frequency (HF) data dependent error signal to the control processor 140. Operation of the error slicers 324, 326 and multiplexer 330 is similar to that described above regarding error slicers 124, 126 and multiplexer 130. This two sets of error slicers simplifies operation of the control processor 140 when supplying the needed slicer thresholds but at the cost of additional slicers and a multiplexer. In this embodiment, the $b_l$ and $b_h$ coefficients are adapted in accordance with the following relationships (7):

when low frequency data is being received: $b_l(n)=b_l(n-1)+\mu_l[v(n)e_l(n)]$; and when high frequency data is being received: $b_h(n)=b_h(n-1)+\mu_h[v(n)e_h(n)]$;  (7)

where v(n) is the detected data from data slicer 122, $e_l(n)$ is the LF data-dependent error signal from multiplexer 130, $e_h(n)$ is the HF data-dependent error signal from multiplexer 330, and $\mu_l$ and $\mu_h$ are the LF and the HF loop gain values, respectively. This embodiment advantageously allows the receiver to concurrently adapt the coefficients without adapting one then the other during different time intervals.

Returning to FIG. 2, at step 212 the voltage-temperature (VT) metrics are calculated from the monitor coefficients $b_l$ and $b_h$. In one embodiment, a ratio of the coefficients at time n is calculated in accordance with the following relationship (8):

$$PDTR(n)=b_l(n)/b_h(n) \quad (8)$$

To speed up the process 200, this calculation might be done using tables to compute the ratio.

Next, a change or delta in the PDTR(n) is calculated over time interval Tmeas in accordance with the following relationship (9):

$$\Delta PDTR(Tmeas)=PDTR(n)-PDTR(n-Tmeas) \quad (9)$$

which might be normalized by dividing ΔPDTR(Tmeas) by PDTR(n–Tmeas) in accordance with the following relationship (10):

$$\Delta PDTR_N(Tmeas)=\Delta PDTR(Tmeas)/PDTR(n-Tmeas) \quad (9)$$

The metric ΔPDTR(Tmeas) or its normalized version $\Delta PDTR_N$(Tmeas) represents a change in the peaking or high frequency content of the AEQ-equalized signal y(t) (FIG. 1).

In addition to the high frequency metric ΔPDTR(Tmeas), a low frequency metric ΔLFT(Tmeas) representing the change in DC gain of the AEQ equalized signal is determined in accordance with the following relationship (10):

$$\Delta LFT(Tmeas)=b_l(n)-b_l(n-Tmeas) \quad (10)$$

which might be normalized by dividing ΔLFT(Tmeas) by $b_l$(n–Tmeas) in accordance with the following relationship (10):

$$\Delta LFT_N(Tmeas)=\Delta LFT(Tmeas)/b_l(n-Tmeas) \quad (11)$$

Next, in step 214, the above metrics are compared to thresholds to determine whether or not the metric $\Delta PDTR_N$(Tmeas) (or ΔPDTR(Tmeas)) or the metric $\Delta LFT_N$(Tmeas) (or ΔLFT(Tmeas)) exceed a respective threshold value, $TH_{HF}$ and $TH_{LF}$, respectively. In accordance with the following relationships (12):

$$\Delta LFT_N(Tmeas) \geq TH_{LF};$$

$$\Delta PDTR_N(Tmeas) \geq TH_{HF} \quad (12)$$

If either or both of the above conditions are met, then control in process 200 passes back to step 204 and the processor 114 again adapts the AEQ 112 and the DFE 132 to the input signal. Otherwise control passes to step 216 where the coefficients $b_l$ and $b_h$ are readapted and then step 212 repeated.

Hysteresis might be added to the relationships in (12) to reduce the possibly of overly repeating step 204 when repeated small changes in the AEQ gain and coefficient parameters might be noisy and detrimental to the operation of the receiver 106.

The time interval Tmeas is chosen to be many symbol times long and should be consistent with the expected amount of time needed for $b_l$ and $b_h$ to converge in response to a change in the low frequency gain or peaking the adapted signal w(t) experiences. Further, Tmeas might inversely dependent on the adaptation gains $\mu_1$ and $\mu_h$. For example, Tmeas might be 50,000T to 200,000T or longer, with longer periods associated with lower adaptation gain values.

In alternative embodiments, the error latches 124, 126, 324, 326 might be used as eye finder latches that are used to perform eye quality measurements during adaptation by the receiver 106. In other embodiments of the invention, adaptation by the analog equalizer 112 or the DFE 132 alone might be suspended while the coefficients $b_l$ and $b_h$ are being adapted but with a commensurate reduction in the power savings achieved by suspending adaptation by both equalizers. Still further, the above-described technique might be applied to any other equalizer in the receiver 106, e.g., a feed-forward equalizer or multiple instantiations of the DFE in the receiver.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system", "component", "module", "interface", "model", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a processor and the processor can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-processor, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A receiver comprising:
   an analog equalizer having an input coupled to an input node and having an output, the analog equalizer configured to receive an input signal on the input node, and having adjustable parameters;
   a subtractor having a first input coupled to the output of the analog equalizer, a second input, and an output, configured to produce a corrected signal on the output thereof;
   a data slicer having an input coupled to the output of the subtractor and configured to provide detected data at an output thereof;
   a decision feedback equalizer having tap coefficients, an input coupled to the output of the data slicer, and an output coupled to the second input of the subtractor, configured to produce a filtered data signal to the subtractor; and
   a processor configured to:
      a) adapt parameters of the analog equalizer and tap coefficients of the decision feedback equalizer to the received signal;
      b) suspend the adaptation of the equalizers once the parameters and tap coefficients have converged or a time period has expired;
      c) while the adaption of the equalizers are suspended:

d) monitor the corrected signal to measure changes in the corrected signal due to power supply voltage and operating temperature changes;

e) compare the measured changes in the corrected signal to corresponding threshold values and, if any of the measured changes exceed the corresponding threshold value, then repeating steps a)-e), otherwise repeating steps d)-e).

2. The apparatus of claim 1, wherein the analog equalizer comprises:
a variable gain amplifier coupled to the input of the receiver; and
a continuous time linear equalizer coupled between the variable gain amplifier and the first input of the subtractor;
wherein one parameter of the analog equalizer is the gain of the variable gain amplifier and another parameter of the analog equalizer is a frequency peaking coefficient of the continuous time linear equalizer.

3. The apparatus of claim 2 further comprising:
at least one error slicer having an input coupled to the output of the slicer, an output, and a threshold input;
a data pattern detector, responsive to the output of the data slicer, configured to determine a frequency of the detected data;
wherein, in step d), the processor is further configured to:
adapt a first monitor coefficient during a first interval and update the first monitor coefficient in response to the data pattern detector; and
adapt a second monitor coefficient during a second interval and update the second monitor in response to the data pattern detector.

4. The apparatus of claim 3 wherein the first monitor coefficient is updated when the data pattern detector determines low frequency data is being received, and the second monitor coefficient is updated when the data pattern detector determines high frequency data is being received.

5. The apparatus of claim 4 wherein the first time interval and the second time interval do not overlap and the threshold of the error slicer is set to the value of the monitor coefficient being adapted.

6. The apparatus of claim 4 wherein the first time interval and the second time interval are substantially the same and wherein the at least one error slicers comprises two error slicers, each error slicer receiving as a threshold a respective one of the first and second monitor coefficients.

7. The apparatus of claim 3 wherein the data pattern detector determines that low frequency data is present when consecutive same-value data bit pattern of length 6T or longer is detected, and the data pattern detector determines that high frequency data is present when consecutive alternating polarity data bit pattern of 2T or less of run length 2 or longer is detected, wherein T is a bit period of the detected data.

8. The apparatus of claim 3 wherein:
the first monitor coefficient, $b_l(n)$, is adapted when low frequency data is being received in accordance with $b_l(n)=b_l(n-1)+\mu_l[v(n)\ e(n)]$; and
the second monitor coefficient, $b_h(n)$, is adapted when high frequency data is being received in accordance with $b_h(n)=b_h(n-1)+\mu_h[v(n)\ e(n)]$;
where $v(n)$ is the detected data, $e(n)$ is an error signal from the error slicer, and $\mu_l$ and $\mu_h$ are loop gain values.

9. The apparatus of claim 8 wherein step e) the processor is further configured to:
generate metrics from the first and second monitor coefficients in accordance with:
$PDTR(n)=b_l(n)/b_h(n)$;
$\Delta PDTR(Tmeas)=PDTR(n)-PDTR(n-Tmeas)$; and
$\Delta LFT(Tmeas)=b_l(n)-b_l(n-Tmeas)$;
wherein $\Delta PDTR(Tmeas)$ represents a change in the peaking or high frequency content of the corrected signal and $\Delta LFT(Tmeas)$ represents a change in DC gain by the equalizer, and Tmeas is a time interval;
compare $\Delta PDTR(Tmeas)$ to a first threshold value; and
compare $\Delta LFT(Tmeas)$ to a second threshold value.

10. A method of controlling the adaptation of a receiver having an analog equalizer filtering a received signal to produce a filtered analog signal, the method comprising:
a) adapting parameters of the analog equalizer to the received signal;
b) suspending the adaptation of the analog equalizer parameters once the parameters have converged or a time period has expired;
c) while the adaption of the analog equalizer parameters are suspended:
d) generating a first error signal in response to the filtered analog signal;
e) adapting a first and second monitor coefficients in response to the first error signal;
f) generating metrics from the first and second monitor coefficients; and
g) comparing the metrics to corresponding threshold values and, if any of the metrics exceed the corresponding threshold value, then repeating steps a)-g), otherwise repeating steps d)-g).

11. The method of claim 10 further comprising:
slicing a corrected signal to produce detected data;
subtracting the detected data from the corrected signal to produce a data error signal;
filtering the data error signal by a decision feedback equalizer to produce a filtered data error signal; and
subtracting the filtered data error signal from the filtered analog signal to produce the corrected signal;
wherein in step a) tap values of the decision feedback equalizer are also adapted, and in step b) the tap values are also suspended.

12. The method of claim 10 wherein step e) comprises:
detecting whether the detected data has a frequency less than a low frequency limit or has a frequency greater than a high frequency limit;
adapting the first monitor coefficient if the detected data frequency is less than the low frequency limit; and
adapting the second monitor coefficient if the detected data frequency is greater than the high frequency limit.

13. The method of claim 12 wherein adaptation of the monitor coefficients in step e) comprises the steps of:
when low frequency data is being received: $b_l(n)=b_l(n-1)+\mu_l[v(n)\ e(n)]$; and
when high frequency data is being received: $b_h(n)=b_h(n-1)+\mu_h[v(n)\ e(n)]$;
where $b_l(n)$ is the first monitor coefficient, $b_h(n)$ is the second monitor coefficient, $v(n)$ is the detected data, $e(n)$ is the first error signal, and $\mu_l$ and $\mu_h$ are loop gain values.

14. The method of claim 13 wherein in step d) the first error signal $e(n)$ is generated by:
slicing the corrected signal with a slicer having a threshold set to substantially i) the value of the first monitor coefficient during a first time period, or ii) the value of the second monitor coefficient during a second time period different from the first time period.

15. The method of claim 12 wherein step d) comprises the steps of:

generating the first error signal by slicing the corrected signal with a slicer having a threshold set to substantially the value of the first monitor coefficient; and generating a second error signal by slicing the corrected signal with a slicer having a threshold set to substantially the value of the second monitor coefficient;

and wherein adaptation of the monitor coefficients occurs substantially concurrently in step e) and comprises the steps of:

when low frequency data is being received: $b_l(n)=b_l(n-1)+\mu_l[v(n)e_l(n)]$; and when high frequency data is being received: $b_h(n)=b_h(n-1)+\mu_h[v(n)e_h(n)]$;

where $b_l(n)$ is the first monitor coefficient, $b_h(n)$ is the second monitor coefficient, $v(n)$ is the detected data, $e_l(n)$ is the first error signal, $e_h(n)$ is the second error signal, and $\mu_l$ and $\mu_h$ are the loop gain values.

16. A method of controlling the adaptation of a receiver having at least one equalizer responsive to a received signal to produce a corrected signal, the method comprising:

a) adapting parameters of the equalizer to the received signal;

b) suspending the adaptation of the equalizer parameters once the parameters have converged or a time period has expired;

c) while the adaption of the equalizer parameters are suspended:

d) monitoring the corrected signal to measure changes in the corrected signal due to power supply and operating temperature changes;

e) comparing the measured changes in the corrected signal to corresponding threshold values and, if any of the measured changes exceed the corresponding threshold value, then repeating steps a)-e), otherwise repeating steps d)-e).

17. The method of claim 16 wherein step d) comprises the steps of:

generating, during a first time period, a first error signal by slicing the corrected signal with a slicer having a threshold set to substantially the value of a first monitor coefficient; and generating, during a second time period, a second error signal by slicing the corrected signal with a slicer having a threshold set to substantially the value of a second monitor coefficient;

adapting, during the first time period, the first monitor coefficient in response to the first error signal;

adapting, during the second time period, the second monitor coefficient in response to the second error signal;

generating metrics from the first and second monitor coefficients;

wherein step e) comprises:

comparing the metrics to corresponding threshold values and, if any of the metrics exceed the corresponding threshold value, then repeating steps a)-e), otherwise repeating steps d)-e).

18. The method of claim 17 wherein the equalizer comprises an analog equalizer.

19. The method of claim 17 wherein the equalizer comprises a decision feedback equalizer, the method further comprising:

slicing the corrected signal to produce detected data;

filtering the detected data by the decision feedback equalizer to produce a filtered data signal; and subtracting the filtered data signal from the received signal to produce the corrected signal;

wherein the parameters include tap coefficients of the decision feedback equalizer.

20. The method of claim 17 wherein the steps of adaptation of the monitor coefficients comprises the steps of:

detecting whether the detected data has a frequency less than a low frequency limit or has a frequency greater than a high frequency limit;

when low frequency data is being received and during the first time period: $b_l(n)=b_l(n-1)+\mu_l[v(n) e_l(n)]$; and when high frequency data is being received and during the second time period: $b_h(n)=b_h(n-1)+\mu_h[v(n) e_h(n)]$;

where $b_l(n)$ is the first monitor coefficient, $b_h(n)$ is the second monitor coefficient, $v(n)$ is the detected data, $e_l(n)$ is the first error signal, $e_h(n)$ is the second error signal, and $\mu_l$ and $\mu_h$ are the loop gain values.

21. The method of claim 20 wherein the step of detecting the frequency of the detected data comprises the steps of:

asserting a signal indicating low frequency data is present when consecutive same-value data bit pattern of length 6T or longer is detected; and asserting a signal indicating high frequency data is present when a consecutive alternate polarity data bit pattern of 2T or less having a run length of 2 or longer is detected;

wherein T is a bit period of the detected data.

22. The method of claim 20 wherein the step of generating metrics from the first and second monitor coefficients comprises:

calculating $PDTR(n)=b_l(n)/b_h(n)$;

calculating $\Delta PDTR(Tmeas)=PDTR(n)-PDTR(n-Tmeas)$; and calculating $\Delta LFT(Tmeas)=b_l(n)-b_l(n-Tmeas)$;

wherein $\Delta PDTR(Tmeas)$ represents a change in the peaking or high frequency content of the corrected signal and $\Delta LFT(Tmeas)$ represents a change in DC gain by the equalizer, and Tmeas is a time interval.

23. The method of claim 22 wherein step 3) comprises the step of:

comparing $\Delta PDTR(Tmeas)$ to a first threshold value; and comparing $\Delta LFT(Tmeas)$ to a second threshold value.

24. The method of claim 23 wherein a hysteresis is applied to the comparing steps.

25. The method of claim 20 wherein the first time period and the second time period are substantially the same.

* * * * *